(12) United States Patent
Jung

(10) Patent No.: US 7,881,367 B2
(45) Date of Patent: Feb. 1, 2011

(54) METHOD OF VIDEO CODING FOR HANDHELD APPARATUS

(75) Inventor: Joël Jung, Le Mesnil St Denis (FR)

(73) Assignee: NXP B.V., Eindhoven (NL)

( * ) Notice: Subject to any disclaimer, the term of this patent is extended or adjusted under 35 U.S.C. 154(b) by 1589 days.

(21) Appl. No.: 10/543,432

(22) PCT Filed: Jan. 21, 2004

(86) PCT No.: PCT/IB2004/000173

§ 371 (c)(1),
(2), (4) Date: Jul. 26, 2005

(87) PCT Pub. No.: WO2004/068835

PCT Pub. Date: Aug. 12, 2004

(65) Prior Publication Data

US 2006/0171454 A1    Aug. 3, 2006

(30) Foreign Application Priority Data

Jan. 29, 2003    (EP) .................................. 03290225

(51) Int. Cl.
*H04N 7/18*    (2006.01)
(52) U.S. Cl. ............................. 375/240.01; 375/240.25
(58) Field of Classification Search ................................
375/240.01–240.29
See application file for complete search history.

(56) References Cited

U.S. PATENT DOCUMENTS

| 5,949,484 A | 9/1999 | Maruyama et al. |
| 6,169,766 B1 | 1/2001 | Aoki et al. |
| 7,366,237 B2 * | 4/2008 | Yu et al. ................. 375/240.16 |

(Continued)

FOREIGN PATENT DOCUMENTS

| CN | 1213230 A | 4/1999 |
| EP | 1 227 684 A2 | 7/2002 |
| WO | 99/09747 A1 | 2/1999 |

OTHER PUBLICATIONS

Wiegand T. et al: Lagrange Multiplier Selection in Hybrid Video Coder Control, IEEE, vol. 1, Conf. 8, Oct. 2001, pp. 542-545.

(Continued)

*Primary Examiner*—Andy S Rao

(57) ABSTRACT

The present invention relates to method of coding blocks of video data for a handheld apparatus comprising a battery. Said method comprising a step of computing a residual error block from the use of a set of prediction functions having different power consumption levels. It also comprises a step of enabling or disabling a prediction function of the set depending on its associated power consumption level for a predetermined level of the battery. It finally comprises a step of selecting a prediction function among a set of enabled prediction functions to code the residual error block.

14 Claims, 3 Drawing Sheets

U.S. PATENT DOCUMENTS

| | | | |
|---|---|---|---|
| 2001/0026642 | A1 | 10/2001 | Kang et al. |
| 2001/0031004 | A1 | 10/2001 | Kim et al. |
| 2002/0051490 | A1 | 5/2002 | Naito |
| 2002/0094028 | A1 | 7/2002 | Kimoto |
| 2004/0001547 | A1* | 1/2004 | Mukherjee ............ 375/240.16 |

OTHER PUBLICATIONS

Stockhammer T. et al: H.264/AVC in Wireless Environment, IEEE, vol. 13, No. 7, Jul. 2003, pp. 657-673.

Chi-Weon Yoon, et al: an 80/20 MHz 160 mW Multimedia Processor Integrated with Embedded DRAM, MPEG-4 Accelerator and 3-D Rendering Engine for Mobile Application. IEEE, vol. 36, No. 11, Nov. 2001, pp. 1758-1767.

Christipher De Vleeschouwer, et al: Motion Estimation for Low Power Video Devices, IEEE, vol. 2, 2001, pp. 953-956.

Lan, T. et al. "Power Optimized Mode Selection for H.263 Video Coding and Wireless Communications", Proc. Intl. Conf. on Image Processing, IEEE Comput. Soc., pp. 113-117 (Oct. 1998).

Zhang, R. et al. "Switched Error Concealment and Robust Coding Decisions in Scalable Video Coding", Proc. Int'l. Conf. on Image Processing, IEEE, vol. 3, pp. 380-383 (Sep. 2000).

Eisenberg, Y. et al. "Energy Efficient Wireless Video Communications for the Digital Set-Top Box", Proc. Int'l. Conf. on Image Processing, IEEE, vol. 2. of 3, pp. 25-28 (Sep. 2002).

International Preliminary Report on Patentability for appln. No. PCT/IB2004/000173 (Jul. 29, 2005).

* cited by examiner

METHOD OF VIDEO CODING FOR HANDHELD APPARATUS

FIELD OF THE INVENTION

The present invention relates to a method of coding blocks of video data for a handheld apparatus comprising a battery.

This invention is particularly relevant for mobile apparatus such as, for example, a mobile phone or personal digital assistant, said apparatus comprising an embedded camera able to acquire and to code video data before sending it.

BACKGROUND OF THE INVENTION

Up to now, video coding methods have been evaluated regarding compression efficiency. The objectives of the first video standards were indeed the storage of films on a CD (MPEG-1), the broadcast of television programs on cable/satellite (MPEG-2) and the streaming/downloading of video contents over the Internet (MPEG-4). The constraints were bandwidth and storage capacity limitations. The second evaluation criterion was the computational complexity, especially in applications where real-time coding was necessary. Today, compression efficiency is still wanted, while computational complexity becomes less and less problematic thanks to the increasing speed of processors. In new applications, however, a third criterion is getting more and more important. It is power consumption. Mobile devices, such as personal digital assistants or mobile phones, are expected to offer video coding capabilities in a near future. But with existing techniques autonomy is dramatically short. Battery life extension and advances in hardware implementation might increase it, but certainly not enough.

In the known state of the art, the power consumption is either controlled from an architectural point of view or from an algorithm point of view.

In the architectural approach, some work is done to map and optimize a video architecture to a predetermined video algorithm. For example, the paper entitled "An 80/20 MHz 160 mW multimedia processor integrated with embedded DRAM, MPEG-4 accelerator and 3-D rendering engine for mobile applications", by C. W. Yoon and al., IEEE Journal of Solid-State Circuits, Volume: 36, Issue: 11, pp. 1758-1767, November 2001, describes a low power consumption video device. Said device comprises embedded memories that are located close to the central processing unit CPU and co-processors, such that an access to their data goes through less cable and dissipates less energy. According to this conventional approach, however, power matters are considered too late and result in a non-optimal solution.

The paper entitled "Motion Estimation for Low Power Video Devices", by C. De Vleeschouwer, T. Nilsson, in International Conference on Image Processing, 2001., Vol. 2, 2001, pp. 953-956, describes a low power method. In this document, the low power consumption is achieved by reducing memory accesses and transfers. For that purpose, the motion estimation has been simplified but at the cost of compression performance.

SUMMARY OF THE INVENTION

It is an object of the invention to provide a method of video coding for a handheld apparatus comprising a battery, which both reduces power consumption significantly and maintains competitive compression efficiency.

To this end, the coding method in accordance with the invention comprises the steps of:

computing a residual error block from the use of a set of prediction functions having different power consumption levels, enabling or disabling a prediction function of the set depending on its associated power consumption level for a predetermined level of the battery, selecting a prediction function among a set of enabled prediction functions to code the residual error block.

The video coding method in accordance with the invention takes advantage of the battery level information to adapt itself by enabling or disabling some of the prediction functions. Then, it selects, among all available prediction functions, the one that is the most adapted to the current block, for example the one that minimizes a cost function. Depending on the battery level, the video quality is consequently higher or lower, and the battery lifetime is increased.

With the present invention, power consumption is not only seen as a matter of architecture, but also as a matter of algorithmic design, leading to a lowered power consumption. Moreover, reducing the energy dissipation of a video-coding chip increases the reliability of said chip and allows a significant attenuation of the cooling effort. Therefore production costs are greatly lowered.

The present invention also relates to a video coder implementing said video coding method.

It relates to a handheld apparatus comprising said video coder and a battery for supplying said video coder.

It finally relates to a computer program comprising program instructions for implementing, when said program is executed by a processor, the video coding method according to the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for adapting the power consumption of a video codec (for coder-decoder) to a current battery level. Said method is intended for handheld devices such as mobile phones or Personal Digital Assistants.

It relates, more especially, to H.264 coded sequences but it will be apparent to a person skilled in the art that said method stays also applicable to any type of video sequences coded with a predictive block-based technique such as, for example, those provided by MPEG-1, MPEG-2, MEGA-4, H-261 or H-263 standards.

Figure 1:
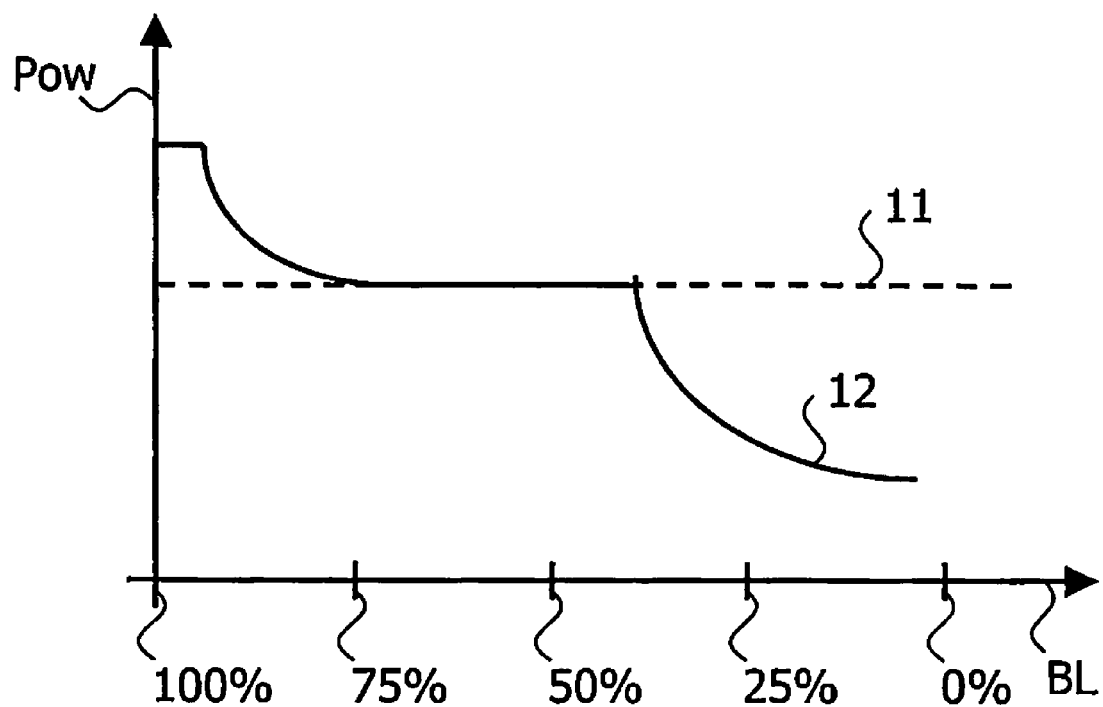
FIG. 1 is a curve representing schematically the power consumption of a video codec as a function of a battery level according to the prior art and invention.

The invention is based on the following principle. If the battery is full or near full, the video codec in accordance with the invention is adapted to be more power consuming, yielding to an improved video quality compared to a non-adaptive classical low power method. If the battery is in a medium state, the behavior is substantially equivalent to the non-adaptive classical low power method. If the battery is empty or near empty, the video codec is adapted to be less power consuming in order to provide longer lifetime while gradually reducing the quality of the video. Said principle is depicted in FIG. 1, which represents the power consumption (Pow) of a video codec as a function of the battery level (BL) for a conventional codec (11) and a codec in accordance with the invention (12).

Figure 2:
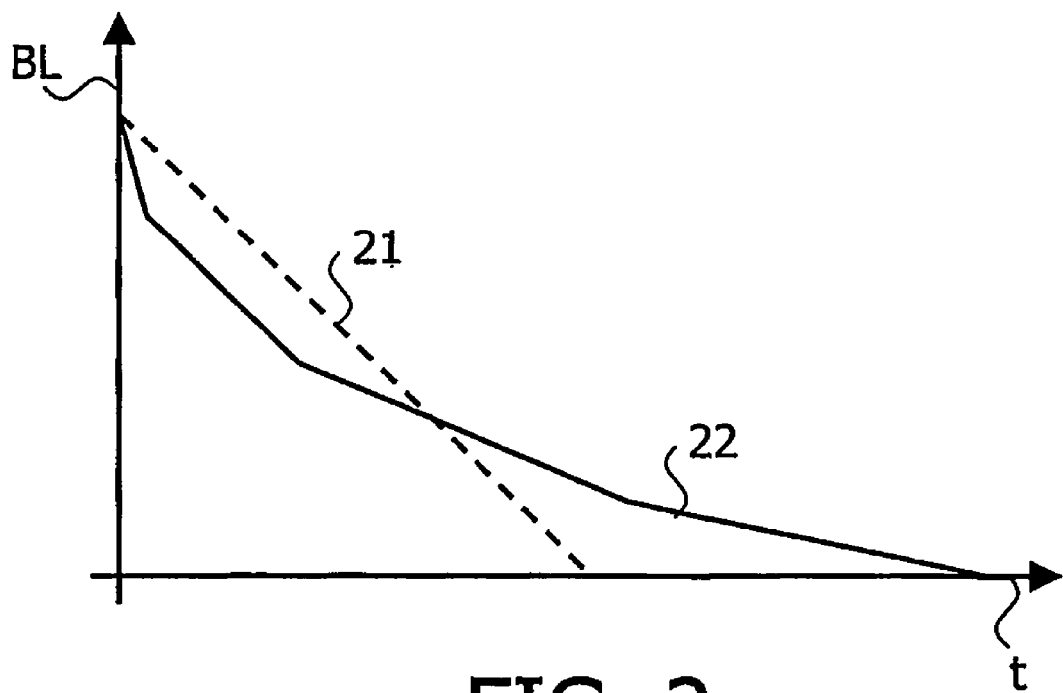
FIG. 2 represents schematically the evolution of the battery level as a function of the time of use according to the prior art and invention.

FIG. 2 is a comparison of the battery level (BL) as a function of the time of use (t) between a conventional codec (21) and a codec in accordance with the invention (22). If the battery is full, power consumption will be higher and image quality better. In this case, someone that can plug and charge his handheld apparatus frequently will always have an increased quality. On the contrary, if the battery level becomes low the handheld apparatus will still be able to code and or decode video instead of shutting down, but at the price of a lower quality.

Let us consider a conventional video architecture comprising a central processing unit CPU, coupled with a dedicated co-processor, and an external memory module. For years, the central processing unit CPU has been considered as the greediest of these three elements in terms of power consumption, implying that the computational complexity of an algorithm also determined its energy consumption. Now, the repartition is more balanced between the computational load and the memory accesses. And given the current evolution, a predominance of the latter can be foreseen soon. Consequently, having such architecture in mind, low-power applications require a significant reduction of memory accesses compared to current algorithms. Furthermore, the locality of these accesses is important too, because a memory module closer to the CPU means less energy dissipation when accessing data.

Figure 3:
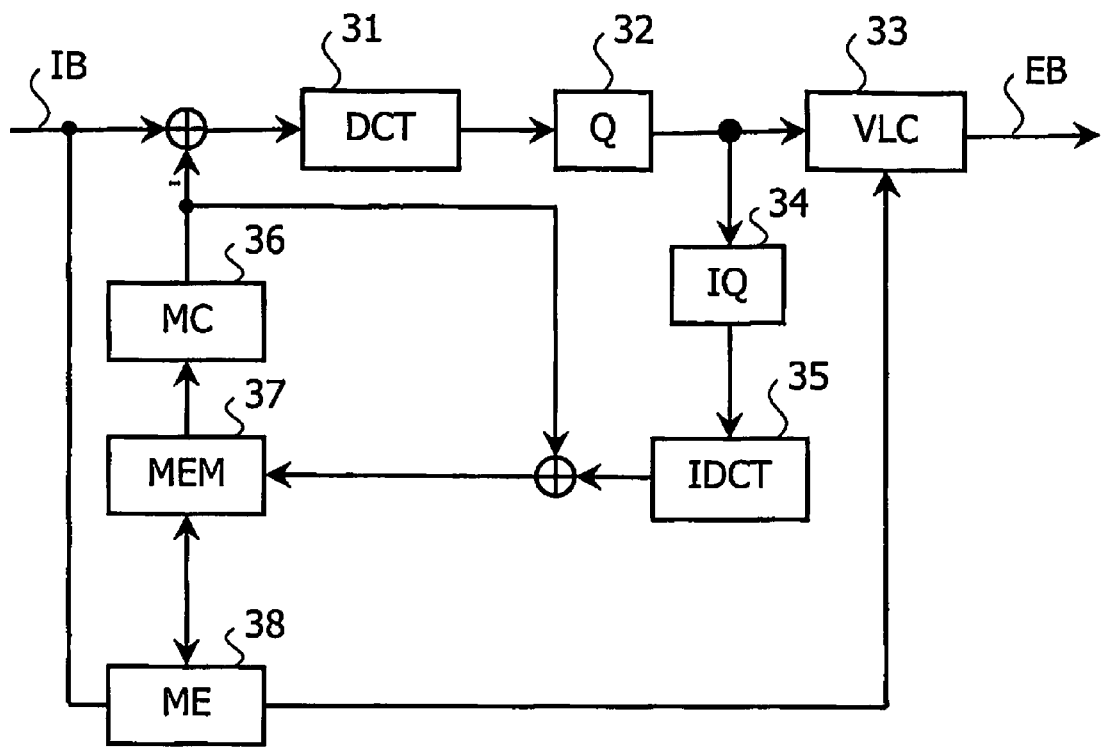
FIG. 3 is a block diagram showing a video coder.

In the case of a conventional video coder depicted in FIG. 3, the above described elements are adapted to perform Discrete Cosine Transformation DCT (31), scalar quantization Q (32), variable length coding VLC (33), inverse quantization IQ (34), Inverse Discrete Cosine Transformation IDCT (35), motion compensation MC (36) and motion estimation (38). The bottleneck in terms of power consumption is the amount of transfers between these different units of the video architecture. The present invention is based on the observation that most of the memory transfers come from the conventional motion estimation. When a video data block is to be coded, the motion estimation ME looks for a reference block that best matches in a previous frame, among several blocks. The resulting value, called residual value, is then coded and corresponds to the difference between the pixels of the current block and the reference block found by the motion estimation ME. This represents many accesses to pixels, and so to the external memory module. The larger the search range, the larger the size of the memory and consequently the power dissipation. This kind of prediction is thus not adapted for power consumption matters.

To maintain competitive compression efficiency while decreasing the power consumption, the propose invention proposes to replace the conventional motion estimation ME by N concurrent prediction functions (pf1, pf2, ..., pfN). A prediction function is defined as a way to predict, in a current frame, a current block, i.e. the one that is intended to be coded, based on pixels from other blocks, located either in the same frame, or in a previous or future frame. In other words, a prediction function is able to compute a residual error between the current block and another block. These prediction functions are well adapted to implement power consumption scalability. The main characteristic of said prediction functions is that they all work locally and on very few data. It is thus possible to use registers, which are small, fast and cost-less internal memories, to save power. Furthermore, video data blocks are coded independently, which makes this process highly parallel. Hence, using all the prediction functions demands much less energy than the conventional motion estimation. In terms of compression efficiency, the lack of motion compensation is counter-balanced by an increased computational effort.

In the following embodiment, we use N=5 prediction functions. They are presented below.

Figure 5:
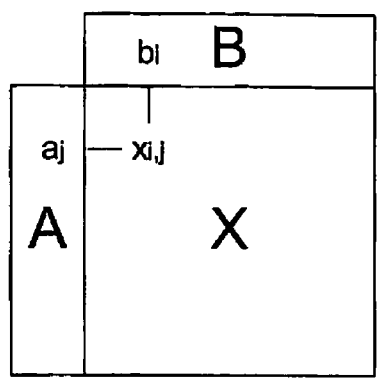
FIG. 5 represents a block and its neighborhood, from which spatial prediction functions are computed.

A first prediction function pf1 is based on H.264 Intra Prediction. For a given pixel $x(i,j)$ in a current block X to code, a residual value $r(i,j)$ is computed from the left-adjacent column and the top-adjacent line of block X, as described in FIG. 5. The residual value $r(i,j)$ is computed as follows:

$$r(i,j)=x(i,j)-\mathrm{avg}(A,B),$$

where avg(A,B) is a function able to compute the average value of the segments A and B.

This first spatial prediction is particularly adapted to homogeneous areas.

A second prediction function pf2 is based on H.264 Intra Vertical Prediction. With the notations given in FIG. 5, the residual value is computed as follows:

$$r(i,j)=x(i,j)-b(i).$$

This second spatial prediction is particularly adapted to vertically homogeneous areas.

A third prediction function pf3 is based on H.264 Intra Horizontal Prediction. With the notations given in FIG. 5, the residual value is computed as follows:

$$r(i,j)=x(i,j)-a(j).$$

This third spatial prediction is particularly adapted to horizontally homogeneous areas. Several other spatial predictions are also possible. They have in common to only use A and B segments, or apply invertible functions on X, to be decodable.

Figure 6:
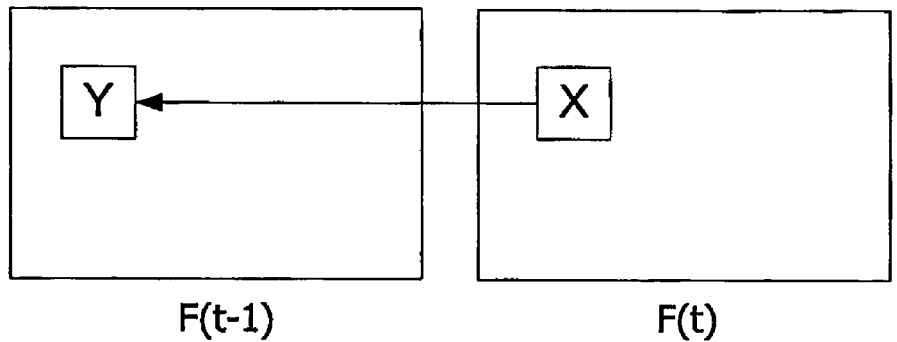
FIG. 6 represents two blocks in two successive frames, from which a temporal prediction function is computed.

A fourth prediction function pf4 is based on FIG. 6 representing a block X of pixels $x(i,j)$ in a current frame $F(t)$ and a corresponding block Y of pixels $y(i,j)$ having the same position in the immediately past frame $F(t-1)$. This function is called "Collocated Temporal Prediction". With the notations given in FIG. 6, the residual value is computed as follows:

$$r(i,j)=x(i,j)-y(i,j).$$

This fourth temporal prediction is particularly adapted to static areas. An extension of this prediction function called "Collocated Restricted Motion Estimation" and for which motion estimation is performed within the collocated block only can also be used.

Figure 7:
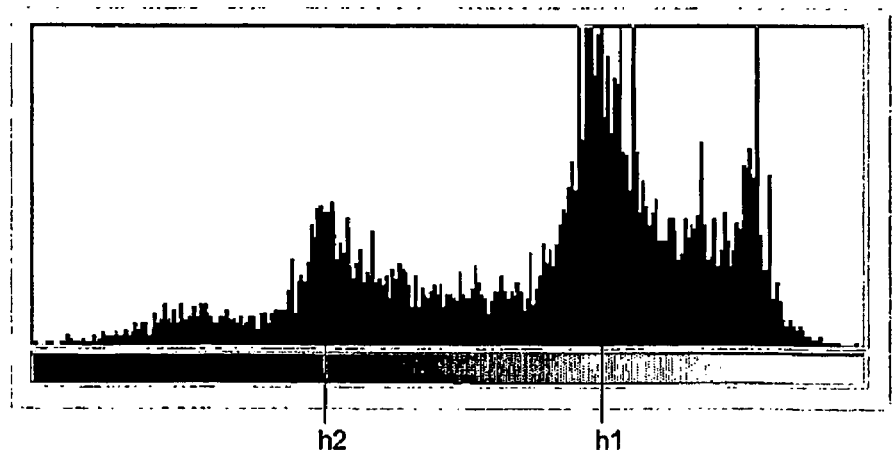
FIG. 7 represents a histogram of a block in a past frame, from which a temporal prediction function is computed for a current collocated block.

A fifth prediction function pf5, called "Temporal Histogram Prediction", uses a histogram of the collocated block in the previous frame. If, for example, h1 and h2 are two maximums of the histogram, as given in FIG. 7, the residual value is computed as follows:

$$r(i,j)=x(i,j)-h1 \text{ or } r(i,j)=x(i,j)-h2,$$

depending on the proximity of the value x(i,j) with the values h1 and h2. For that purpose, one bit is transmitted to inform the decoder of this choice.

This temporal prediction is also adapted to static areas.

The prediction functions have their own properties both in terms of compression efficiency and power consumption. The most appropriate prediction function is selected thanks to a cost value. This cost value depends on an entropy h of a current block of residual data after run-length coding, and on a reconstruction error mse between the decoded block and the reference block.

According to an embodiment of the invention, the cost value c1 of a current block is computed as follows:

$$c1 = h*q + \frac{mse}{2}$$

where q is the quantization step of the current block.

Finally, the prediction function that minimizes this cost is selected for coding the current block.

These different prediction functions propose different ways of coding a single block. Given that these prediction functions apply different kinds of processing, they are more or less power consuming. To go further, the video coding method in accordance with the invention introduces power scalability as a process that intends to adapt the behavior of the video coder to the current available resources of the device. The aim is a better power management and a reduction of the overall power consumption, to delay as much as possible the switch-off. It results in an improved video quality when the battery level is high, that progressively decreases as the available power reduces. Thus the video coding becomes available for a longer time, and the overall consumption is reduced.

Figure 4:
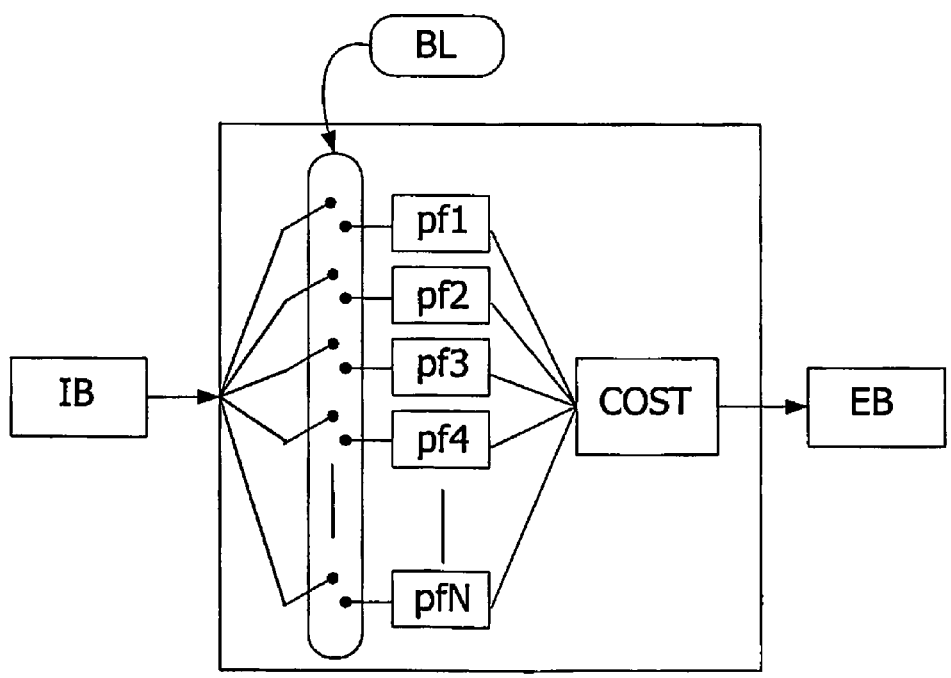
FIG. 4 is a block diagram showing the low power coding method in accordance with the invention.

Power scalability is obtained via a priori choices made by the video coder. Depending on the available resources, the current block is actually passed through M functions instead of N, where M is an integer lower or equal to N, reducing power consumption. FIG. 4 shows a video coding method implementing this power scalability.

The following table illustrates this principle by showing available prediction functions depending on the battery level and the power consumption value assessed for each of prediction function, based on the use of existing tools such as the ones developed by Interuniversity MicroElectronic Centre IMEC, for example.

|  | Prediction functions | | | | |
| --- | --- | --- | --- | --- | --- |
|  | 1st | 2nd | 3rd | 4th | 5th |
| Estimated power consumption (simulation) | 2 | 1 | 1 | 3 | 4 |
| Battery level | Available prediction functions | | | | |
| 100–80% | X | X | X | X | X |
| 80–40% | X | X | X | X |  |
| 40–10% | X | X | X |  |  |
| 10–0% |  | X | X |  |  |

Based on the cost values, the video coder selects, among all available M prediction functions, the one that is the most adapted to the current block. In our example, four battery levels have been defined. The five prediction functions are available for the higher battery level. Four prediction functions, the fifth one that is the most power consuming is no more available, can be chosen for the second higher battery level. Then, only the first, second and third prediction functions are available for the following battery level. Finally, only the first and second prediction functions are available for the lower battery level.

It will be evident to those skilled in the art that the present invention is not limited to the described embodiment and that there are numerous alternatives, which fall within the scope of the appended claims, for example with a different number of battery levels and a different number of prediction functions.

It can also be observed that an apparatus implementing such a power consumption scalability method is susceptible to code the same block of video data in a different way, with a different image quality, at two different moments, depending on the current state of the battery.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A method of coding blocks of video data in a video coder of a handheld apparatus comprising a battery and the video coder, said method comprising the steps of:
   computing a residual error block from the use of a set of prediction functions having different power consumption levels,
   enabling or disabling a prediction function of the set depending on its associated power consumption level for a predetermined level of the battery,
   selecting a prediction function among a set of enabled prediction functions to code the residual error block.

2. A video coding method as claimed in claim 1, wherein the selection step is based on a cost value depending on an entropy of a current block of residual data after run-length coding, on a reconstruction error between the corresponding decoded block and reference block, and on a quantization value of the current block.

3. A video coding method as claimed in claim 1, wherein a prediction function is computed from a difference of a current pixel (x(i,j)) of a current block (X) and at least a value of a vertical segment (A) of pixels adjacent to the left of the current block and/or a horizontal segment (B) of pixels adjacent to the top of the current block.

4. A method of video coding as claimed in claim 1, wherein a prediction function is computed from a difference of a current pixel (x(i,j)) of a current block (X) in a current frame (F(t)) and a corresponding pixel (y(i,j)) of a corresponding block (Y) in an immediately past frame (F(t-1)).

5. A method of video coding as claimed in claim 1, wherein a prediction function is computed from a difference of a current pixel (x(i,j)) of a current block (X) in a current frame (F(t)) and a maximum (h1,h2) of a histogram of a corresponding block (Y) in an immediately past frame (F(t-1)), said maximum being the closest to the value of the current pixel.

6. A video coder for a handheld apparatus comprising a battery for supplying said video coder, the video coder being able to code blocks of video data and comprising a processor configured to:
   compute a residual error block using a set of prediction functions having different power consumption levels,
   enable or disable a prediction function of the set depending on the prediction function's associated power consumption level for a predetermined level of the battery, and select a prediction function among a set of enabled prediction functions to code the residual error block.

7. A handheld apparatus comprising;
a battery; and
a video coder that uses power supplied by the battery and is configured to
compute a residual error block using a set of prediction functions having different power consumption levels,
enable or disable a prediction function of the set depending on the prediction function's associated power consumption level for a predetermined level of the battery, and
select a prediction function among a set of enabled prediction functions to code the residual error block.

8. A computer readable storage medium having processor-executable program instructions stored thereon, for coding blocks of video data for a handheld device including a battery, wherein execution of said program instructions by a processor causes the processor to perform video coding operations including
computing a residual error block using a set of prediction functions having different power consumption levels,
enabling or disabling a prediction function of the set based upon the prediction function's associated power consumption level for a predetermined level of the battery, and
selecting an enabled prediction function from the set of prediction functions to code the residual error block.

9. The video coder of claim 6, wherein the processor is configured to select a prediction function based on a cost value depending on an entropy of a current block of residual data after run-length coding, on a reconstruction error between the corresponding decoded block and reference block, and on a quantization value of the current block.

10. The video coder of claim 6, wherein the processor is configured to compute a prediction function from a difference of a current pixel ($x(i,j)$) of a current block (X) and at least a value of a vertical segment (A) of pixels adjacent to the left of the current block and/or a horizontal segment (B) of pixels adjacent to the top of the current block.

11. The video coder of claim 6, wherein the processor is configured to compute a prediction function from a difference of a current pixel ($x(i,j)$) of a current block (X) in a current frame (F(t)) and a corresponding pixel ($y(i,j)$) of a corresponding block (Y) in an immediately past frame (F(t-1)).

12. The video coder of claim 6, wherein the processor is configured to compute a prediction function from a difference of a current pixel ($x(i,j)$) of a current block (X) in a current frame (F(t)) and a maximum (h1,h2) of a histogram of a corresponding block (Y) in an immediately past frame (F(t-1)), said maximum being the closest to the value of the current pixel.

13. The video coder of claim 6, wherein the video coder includes a video codec that encodes and decodes video data, and wherein the processor is configured to enable or disable a prediction function of the set by enabling or disabling a prediction function based upon the power consumption level of the video codec when the video codec uses the prediction function.

14. The method of claim 1, wherein enabling or disabling a prediction function of the set includes enabling or disabling a prediction function based upon the power consumption level of a video codec when the video codec uses the prediction function.

* * * * *